(12) United States Patent
Son et al.

(10) Patent No.: US 7,184,420 B2
(45) Date of Patent: Feb. 27, 2007

(54) METHOD FOR DYNAMICALLY LOCATING A WIRELESS TCP PROXY IN A WIRED/WIRELESS INTEGRATED NETWORK

(75) Inventors: Jiyeon Son, Daejeon (KR); Ji Eun Kim, Gwangju (KR); Jun Seok Park, Daejeon (KR); Dong Won Han, Daejeon (KR); Chae Kyu Kim, Daejeon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 1048 days.

(21) Appl. No.: 10/098,436

(22) Filed: Mar. 18, 2002

(65) Prior Publication Data

US 2003/0076806 A1    Apr. 24, 2003

(30) Foreign Application Priority Data

Oct. 24, 2001    (KR)    ................. 2001-65561

(51) Int. Cl.
*H04Q 7/00*    (2006.01)
*H04Q 7/20*    (2006.01)
*H04B 7/216*    (2006.01)
*H04Q 7/24*    (2006.01)

(52) U.S. Cl. ............... 370/331; 370/335; 370/342; 455/439; 455/442; 455/449

(58) Field of Classification Search ............... None
See application file for complete search history.

(56) References Cited

U.S. PATENT DOCUMENTS 5,941,988 A    8/1999    Bhagwat et al.
6,192,243 B1 *   2/2001    Yang et al. ............ 455/436
6,947,401 B2 *   9/2005    El-Malki et al. ......... 370/331
6,977,938 B2 * 12/2005    Alriksson et al. ........ 370/401
6,982,967 B1 *   1/2006    Leung .................. 370/328
6,992,994 B2 *   1/2006    Das et al. .............. 370/328
6,992,995 B2 *   1/2006    Agrawal et al. ......... 370/328

OTHER PUBLICATIONS

Charles E. Perkins, Sun Microsystems, Inc; and Kuang-Yeh Wang, Dept. of Computer Science, University of Maryland, "Optimized Smooth Handoffs in Mobile IP", Proceedings of IEEE International Symposium on Computers and Communications, 1999, pp. 340-346.
Rohit Ghai and Suresh Singh, Dept. of Computer Science, University of South Carolina, "An Architecture and Communication Protocol for Picocellular Networks", IEEE Personal Communications Magazine, 1994, vol. 1(3), pp. 36-46.

* cited by examiner

*Primary Examiner*—Chi Pham
*Assistant Examiner*—Melanie Jagannathan
(74) *Attorney, Agent, or Firm*—Mayer Brown Rowe & Maw LLP

(57) ABSTRACT

A method for dynamically locating a wireless TCP proxy in a routing path in a wired/wireless integrated network is provided. A proxy for a mobile host transmits a proxy change request to a first higher-level proxy if a mobility of the mobile host is larger than a mobility threshold that is preset in the proxy. The first higher-level proxy determines whether the mobility of the mobile host is larger than a mobility threshold that is preset in the first higher-level proxy. The first higher-level proxy transmits a proxy change request packet to a second higher-level proxy if the mobility of the mobile host is larger than the mobility threshold of the first higher-level proxy. The second higher-level proxy selectively permits the proxy change if the mobility of the mobile host is smaller than the mobility threshold of the second higher-level proxy.

6 Claims, 6 Drawing Sheets

METHOD FOR DYNAMICALLY LOCATING A WIRELESS TCP PROXY IN A WIRED/WIRELESS INTEGRATED NETWORK

FIELD OF THE INVENTION

The present invention relates to a method for dynamically locating a wireless TCP proxy depending on a mobility of a mobile host or a state of network when there is a multiplicity of wireless TCP (transmission control protocol) proxies in a communication path of a wired/wireless integrated network; and, more particularly, to a method for activating the wireless TCP proxy depending on the mobility of the mobile host, the mobility being estimated based on information collected by a monitoring, so that efficiency of TCP function in the wired/wireless integrated network can be increased.

BACKGROUND OF THE INVENTION

TCP that supports reliable data communication between terminal systems has been improved to be adapted to a conventional wired network. However, an effective data communication method using the TCP in a wireless network is needed to meet ever-increasing demands for Internet access in the wireless network. However, many problems may occur when a conventional TCP is directly adapted to the wireless network, because the conventional TCP interprets a problem of data packet loss as being caused by a burst of data communication demand, despite it is mainly caused by a high transmission error rate and a handoff resulting from a mobility of a wireless host.

There has been suggested a number of methods to prevent a deterioration in efficiency of TCP in the wireless network. The suggested methods are largely classified into two types: One is to modify the conventional TCP used by a wireless mobile terminal, and the other is to install a proxy in the middle of a communication path between two hosts connected through TCP. A proxy, as a solution widely used to overcome differences between network protocols, is used for a local recovery or a disconnection recovery process in data communication using wireless TCP.

In the meanwhile, mobile IP (Internet Protocol), which operates as a lower layer protocol of the wireless TCP, is a standard protocol suggested by IETF (Internet Engineering Task Force). The mobile IP includes a routing function for a mobile host in addition to basic functions of conventional IP. A setup process of a data communication path in the mobile IP includes an advertisement, a registration and a tunneling process. Whenever a mobile host moves from a network where the mobile host currently resides (home network) to a foreign network, a foreign agent (FA) in the foreign network detects the mobility of the mobile host through the advertisement process. The foreign agent, which senses the mobility, sets up a temporary data path to an agent of the home network, i.e., a home agent (HA), through the registration and tunneling processes. Here, in the home agent, an IP address is firstly assigned to the mobile host. Thus, all data packets from hosts that are connected with the mobile host are transmitted to the mobile host via the home agent and the foreign agent.

A wireless TCP proxy, which exists in a routing path between a transmitter and a receiver, is preferably loaded on the home agent or the foreign agent for the efficiency of data transmission/reception, which means that at least two wireless TCP proxies are required in the routing path. Moreover, in order to reduce the packet loss resulting from a handoff in the mobile IP, there are suggested methods to configure the foreign agents in a tree structure. In this case, more than or equal to two TCP proxies exist in the routing path since data packets are transmitted between a transmitter and a receiver via agents as much as a depth of the tree structure.

When the foreign agents are configured in the tree structure (in case a plurality of wireless TCP proxies existing in the routing path are activated), there may be a serious deterioration in efficiency due to a malfunction in a TCP controlling algorism, which results from redundant acknowledgement (ACK) and data transmission.

Although the foreign agents are formed as not the tree structure but a single foreign agent, at least two agents, i.e., a home agent and a foreign agent exist in the data path of the mobile IP. Therefore, at least two wireless TCP proxies are always activated in data communication through the mobile IP.

The simplest method to solve the problem, which arises when a plurality of wireless TCP proxies are used in the communication path, is to fix the position of a wireless TCP proxy at the home agent. This method has an advantage that there is no overhead and packet loss due to the change of the proxy since there is no need to change the proxy even if a mobile host corresponding to the proxy moves from a home network of the mobile host to a foreign network. On the other hand, it has a disadvantage that the mobile IP, as a lower layer protocol, should support a bi-directional tunneling function. Accordingly, the method for locating the proxy at the home agent cannot be used when the bi-directional tunneling function, which is one of the option functions of the mobile IP, is not supported, or when a route optimization function supported by the mobile IP makes data packets bypass the home agent.

Another method to solve the problem is to locate the wireless TCP proxy at an agent that is nearest to the mobile host. Most of wireless TCP's based on a proxy, which have been suggested so far, use such a method. This method has an advantage that an additional bi-directional tunneling function is not required. However, it has a drawback that the wireless TCP proxy should be changed into another as the mobile host moves over boundaries between networks. Consequently, when a mobility of the mobile host is high, there is a problem that the processing overhead caused by frequent changes between proxies is increased.

Still another method is to locate the wireless TCP proxy in a certain level of a structure that is formed hierarchically. This structure is a three-level structure comprising: a mobile host; a mobile support station existing as a cell unit; and a supervisor host for managing a plurality of mobile support stations. An advantage of this method is that it can reduce a proxy change frequency according to the movement of the mobile host by locating the wireless TCP proxy at the supervisor host, while a disadvantage thereof is that there is no flexibility in coping with a varying mobility of the mobile host since the position of the proxy is fixed at the supervisor host.

SUMMARY OF THE INVENTION

It is, therefore, an object of the present invention to provide a method for dynamically locating a wireless TCP proxy depending on a mobility of a mobile host or a state of network when there is a multiplicity of wireless TCP proxies in a transmission path of a wired/wireless integrated network.

In accordance with a preferred embodiment of the present invention, there is provided a method, for dynamically locating a wireless TCP proxy suitable for a mobile host among a plurality of wireless TCP proxies existing in a routing path in a wired/wireless integrated network, which comprises the steps of:

(a) transmitting a proxy change request packet from a proxy controlling the mobile host to a first higher-level proxy if a mobility of the mobile host is larger than or equal to a mobility threshold that is preset in the proxy;

(b) determining whether the mobility of the mobile host is larger than or equal to a mobility threshold that is preset in the first higher-level proxy;

(c) transmitting a proxy change request packet from the first higher-level proxy to a second higher-level proxy if the mobility of the mobile host is larger than or equal to the mobility threshold of the first higher-level proxy; and (d) permitting selectively the proxy to be changed to another proxy if the mobility of the mobile host is smaller than the mobility threshold of the first higher-level proxy or the second higher-level proxy.

In accordance with another preferred embodiment of the present invention, there is provided a method, for dynamically locating a wireless TCP proxy suitable for a mobile host among a plurality of wireless TCP proxies existing in a routing path in a wired/wireless integrated network, which comprises the steps of:

(a) determining whether the mobile host moves into a network which is undertaken by a proxy;

(b) transmitting a proxy change request packet from the proxy to a previous proxy if the mobile host moves into the network; and (c) setting the proxy as a proxy for the mobile host if the previous proxy approves the proxy change request packet.

In accordance with still another preferred embodiment of the present invention, there is provided a method, for dynamically locating a wireless TCP proxy suitable for a mobile host among a plurality of wireless TCP proxies existing in a routing path in a wired/wireless integrated network, which comprises the steps of:

(a) activating only one proxy for the mobile host among the plurality of wireless TCP proxies;

(b) measuring a mobility of the mobile host at a point of time when the mobile host moves outside a network; and (c) changing the proxy for the mobile host into another proxy located in an optimal position, based on the measured mobility of the mobile host.

Therefore, according to the present invention, when there is a multiplicity of wireless TCP proxies in a routing path of a wired/wireless integrated network, a wireless TCP proxy is activated depending on a mobility of a mobile host and a state of a network, the mobility being estimated based on a network resident time of the mobile host. In this way, the present invention can prevent processing overhead resulting from the activation of redundant wireless TCP proxies and also improve the reliability of data communication by coping with a mobile host having a high mobility in an effective manner.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Preferred embodiments of the present invention will now be described in detail with reference to the accompanying drawings.

Figure 1A:
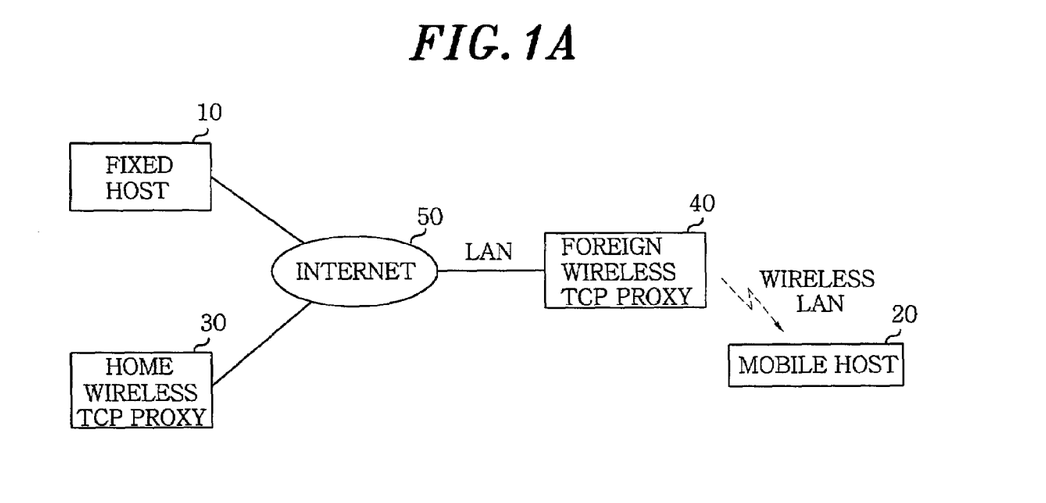
FIGS. 1a and 1b are block diagrams illustrating a wired/wireless integrated network employing a method for dynamically locating a wireless TCP proxy in accordance with the present invention.
Figure 1B:
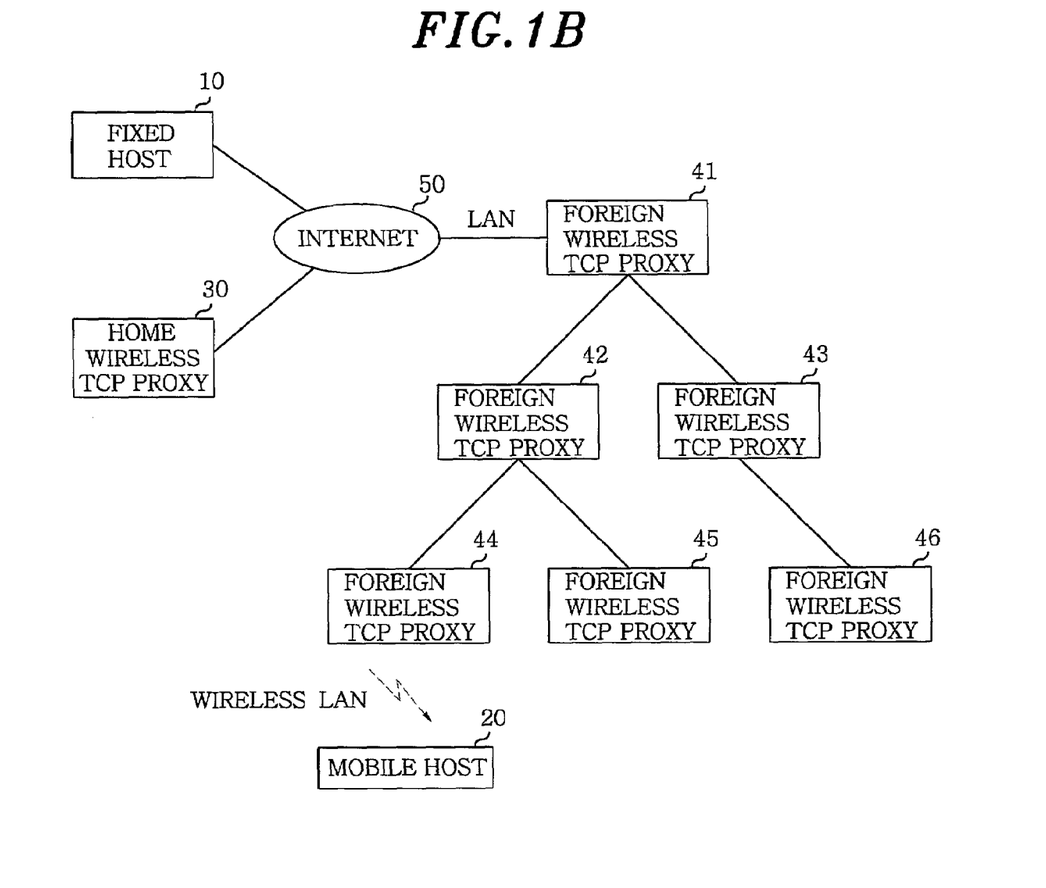

FIGS. 1a and 1b are block diagrams illustrating a wired/wireless integrated network employing a method for dynamically locating a wireless TCP proxy in accordance with the present invention. FIG. 1a, as will be described hereinafter, shows the case that foreign wireless TCP proxies are arranged without a hierarchy therefor, and FIG. 1b depicts the case that foreign wireless TCP proxies are configured hierarchically.

The wired/wireless integrated network illustrated in FIGS. 1a and 1b includes more than one LAN (Local Area Network) or wireless LAN. As illustrated in FIGS. 1a and 1b, in a physical network path between a fixed host 10 and a mobile host 20, a home wireless TCP proxy 30 and a foreign wireless TCP proxy 40 are located. Here, the home wireless TCP proxy 30 refers to a wireless TCP proxy existing in a home network where the mobile host 20 is located, and the foreign wireless TCP proxy 40 refers to a wireless proxy existing in a network where the mobile host 20 is about to move in.

Meanwhile, as describe above, FIG. 1a shows the case that the foreign wireless TCP proxies are arranged without a hierarchy therefor. In this case, TCP data packets are transmitted from the fixed host 10 to the mobile host 20 via the home wireless TCP proxy 30, Internet 50 and the foreign wireless TCP proxy 40. Thus, a higher-level proxy of the foreign wireless TCP proxy 40 becomes the home wireless TCP proxy 30.

On the other hand, FIG. 1b depicts the case that the foreign wireless TCP proxies are configured hierarchically. In this case, TCP data packets are transmitted from the fixed host 10 to the mobile host 20 via the home wireless TCP proxy 30, Internet 50, a highest-level foreign wireless TCP proxy (1) 41, intermediate-level foreign wireless TCP proxies (2,3) 42 and 43 and lowest-level foreign wireless TCP proxies (4 to 6) 44 to 46.

Figure 2:
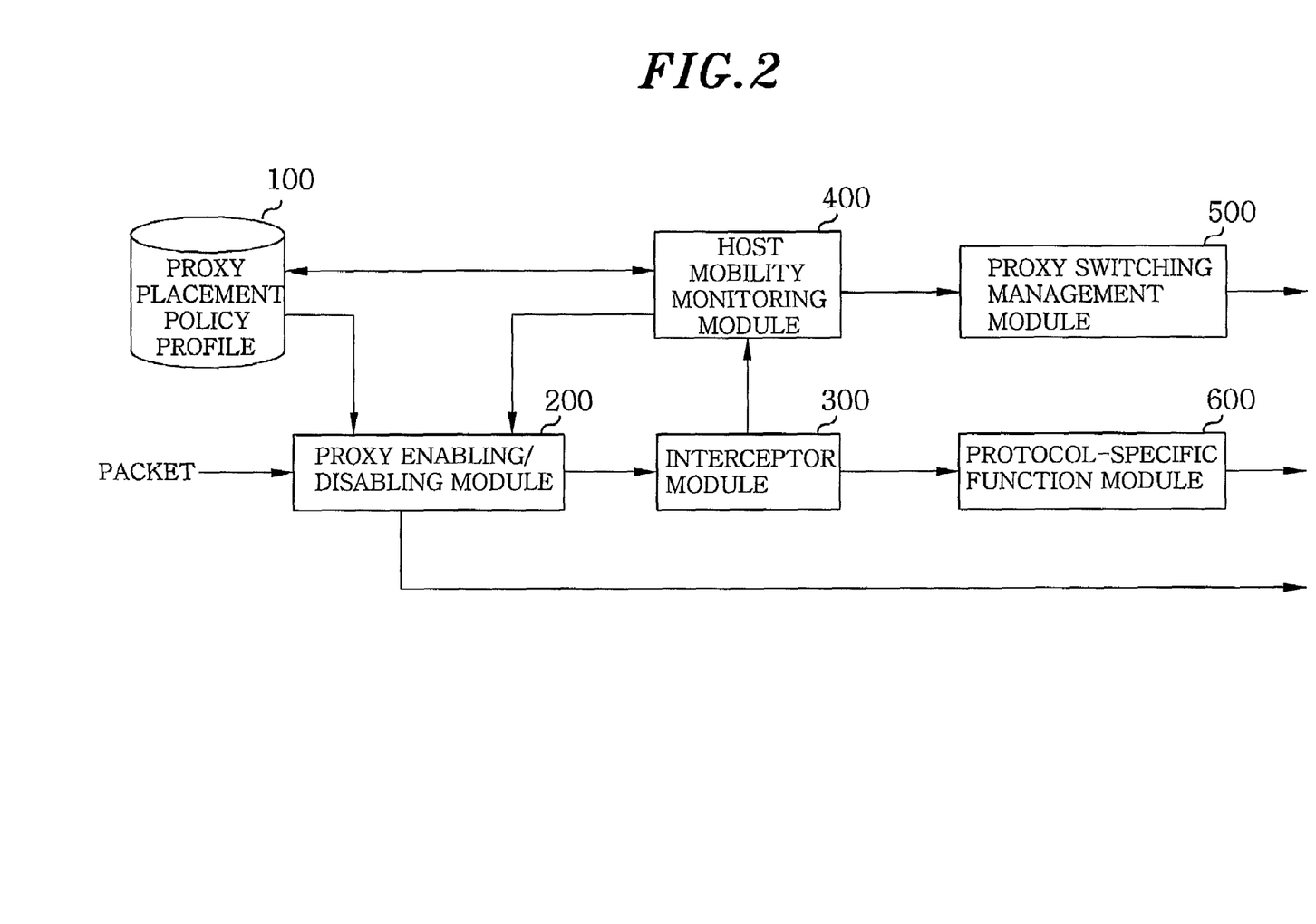
FIG. 2 describes a detailed block diagram describing a structure of the wireless TCP proxy illustrated in FIGS. 1a and 1b.

FIG. 2 exhibits a block diagram showing a detailed structure of a wireless TCP proxy, in accordance with the present invention, that is used in the wired/wireless integrated network illustrated in FIGS. 1a and 1b.

Each of wireless TCP proxies 30 and 40 to 46 includes a proxy placement policy profile 100, a proxy enabling/disabling module 200, a packet interceptor module 300, a host mobility monitoring module 400, a proxy switching management module 500 and a protocol-specific function module 600.

The proxy placement policy profile 100 is a database used for estimating a mobility of the mobile host 20 by determining a threshold and parameters for the mobility. The mobility of the mobile host 20 can be determined by using various parameters, e.g., an average network resident time of the mobile host 20, which will be described later in more detail.

The proxy enabling/disabling module 200 determines whether a proxy corresponding to the mobile host 20 is activated by decoding a packet received through a network. That is, the proxy enabling/disabling module 200 makes only a certain wireless TCP proxy, among a plurality of wireless TCP proxies 30 and 40 to 46, activated for the mobile host 20 in the network.

The packet interceptor module 300 intercepts a network level packet from a wireless link and decodes the intercepted packet. The protocol-specific function module 600 uses the decoded packet for error detection in a wireless communication, a local retransmission, and a disconnection handling function.

The host mobility monitoring module 400 measures the mobility of the mobile host 20 by using parameters defined by the proxy placement policy profile 100. Such a process is performed once when the mobile host 20 moves outside an area of the corresponding wireless network. For instance, when a resident time of the mobile host 20 in the network is used as a reference parameter for determining the mobility of the mobile host 20, the mobility can be obtained by taking a reciprocal of a value calculated by deducting a point of time when the mobile host 20 moves into the network, i.e., when a new TCP connection is set up, from a point of time when the mobile host 20 moves outside the network. The host mobility monitoring module 400 calculates the value only once when the outward movement of the mobile host 20 is detected, so that the host mobility monitoring module 400 hardly requires extra works for the mobility monitoring.

The proxy switching management module 500, as a module to supervise a proxy change process based on the mobility information measured by the host mobility monitoring module 400, performs the proxy change process after a wireless TCP proxy, i.e., a target for the proxy change process, to be changed into is determined by the mobility of the mobile host 20.

A process for dynamically locating a wireless TCP proxy in a wired/wireless integrated network in accordance with the present invention now will be described in detail with reference to FIGS. 3 and 4.

Figure 3:
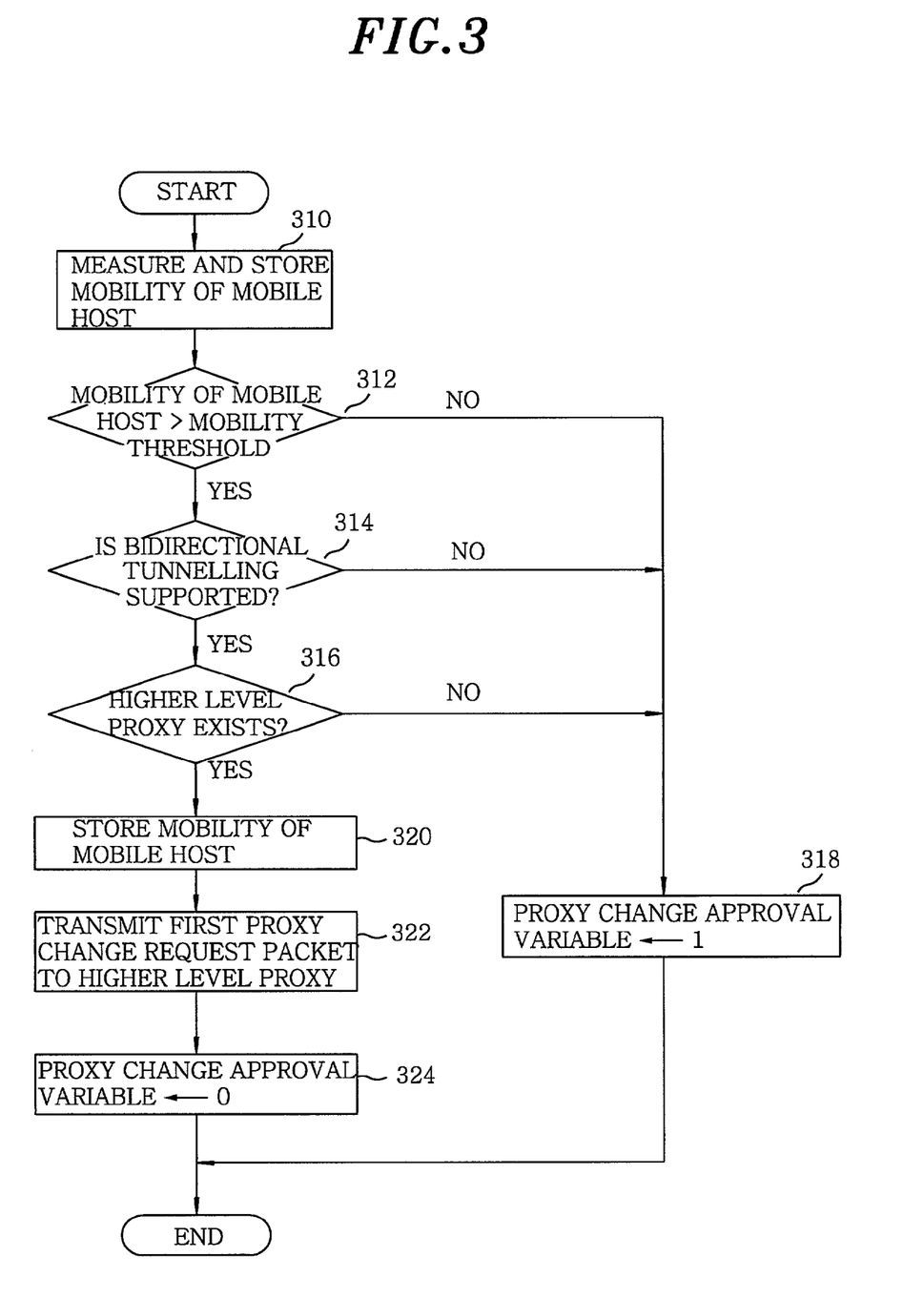
FIG. 3 shows a flow chart showing the operation of a proxy in accordance with the present invention when a mobile host moves outside an area where the proxy controlling the mobile host resides.

FIG. 3 is a flow chart presenting a process for requesting a proxy change to a higher-level proxy, e.g. 30, when the mobility of the mobile host 20, managed by the wireless TCP proxy, e.g. 40, is larger than a predetermined threshold.

As illustrated in FIG. 3, the host mobility monitoring module 400 inside the proxy 40 measures and stores the mobility of the mobile host 20 (step 310). After that, the proxy 40 compares the measured mobility with the predetermined threshold (step 312). Thereupon, if the measured host mobility exceeds the threshold, it is checked whether the wireless TCP, which is currently being used in the network, supports a bi-directional tunneling function (step 314) and also whether a higher-level proxy exists if the wireless TCP supports the bi-directional tunneling function (step 316). If the wireless TCP does not support the bi-directional tunneling function and also if the higher-level proxy does not exist, a proxy change approval variable is set to 1 (step 318) and a process is completed. This variable is used for determining approval/disapproval for a proxy change request from a proxy. A detailed description on the variable will be given later with reference to FIG. 4.

Meanwhile, when the wireless TCP supports the bi-directional tunneling function and the mobility exceeds the threshold and also when the higher-level wireless TCP proxy exists, the host mobility monitoring module 400 records the measured mobility in a mobility field within a first proxy change request packet (step 320) and then transmits the first proxy change request packet to the higher-level proxy (step 322). Depending on the mobility recorded in the mobility field in the first proxy change request packet, the higher-level proxy selectively determines whether to perform a proxy change or not. Next, the proxy change approval variable is set to 0, and the proxy is changed into a waiting state (step 324).

In the present invention, proxy change request packets are categorized into two types: The first proxy change request packet, as described in FIG. 3, includes a message that the proxy for the mobile host (e.g. 40) requests the higher-level proxy (e.g. 30) to undertake a role of a proxy for the mobile host. A second proxy change request packet, which will be described hereinafter, is for noticing the previous proxy for the mobile host that a new proxy is about to undertake a role of a proxy for the mobile host. FIGS. 4a to 4c are flow charts illustrating a process to determine, based on the mobility of the mobile host, whether the proxy is activated as a proxy for the mobile host or requests of the higher-level proxy a proxy change when the proxy receives the proxy change request packet transmitted from another proxy.

Figure 4A:
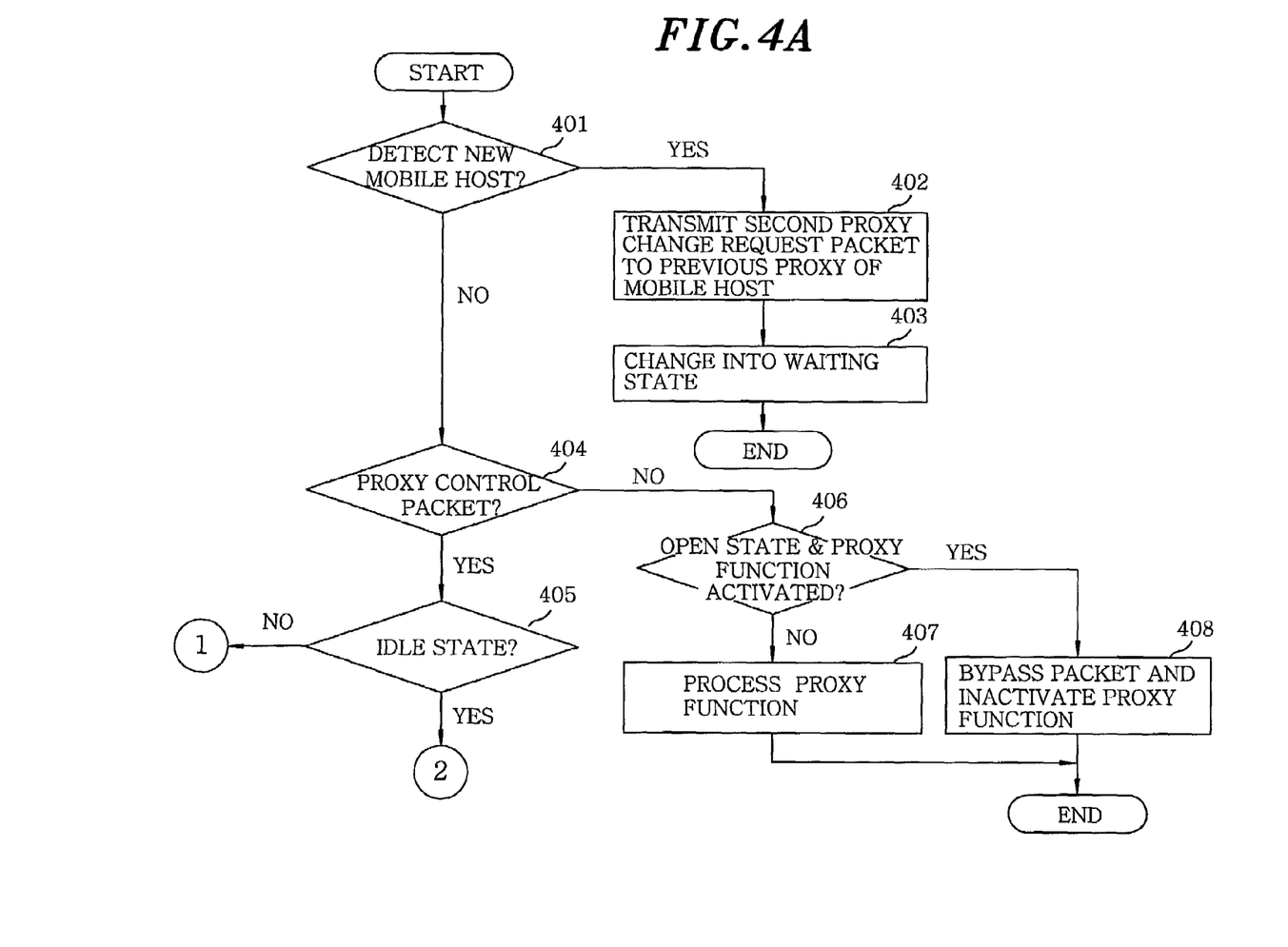
FIGS. 4a to 4c depict flow charts showing the operation of the proxy in accordance with the present invention when the mobile host moves into the area where the proxy controlling the mobile host resides.
Figure 4B:
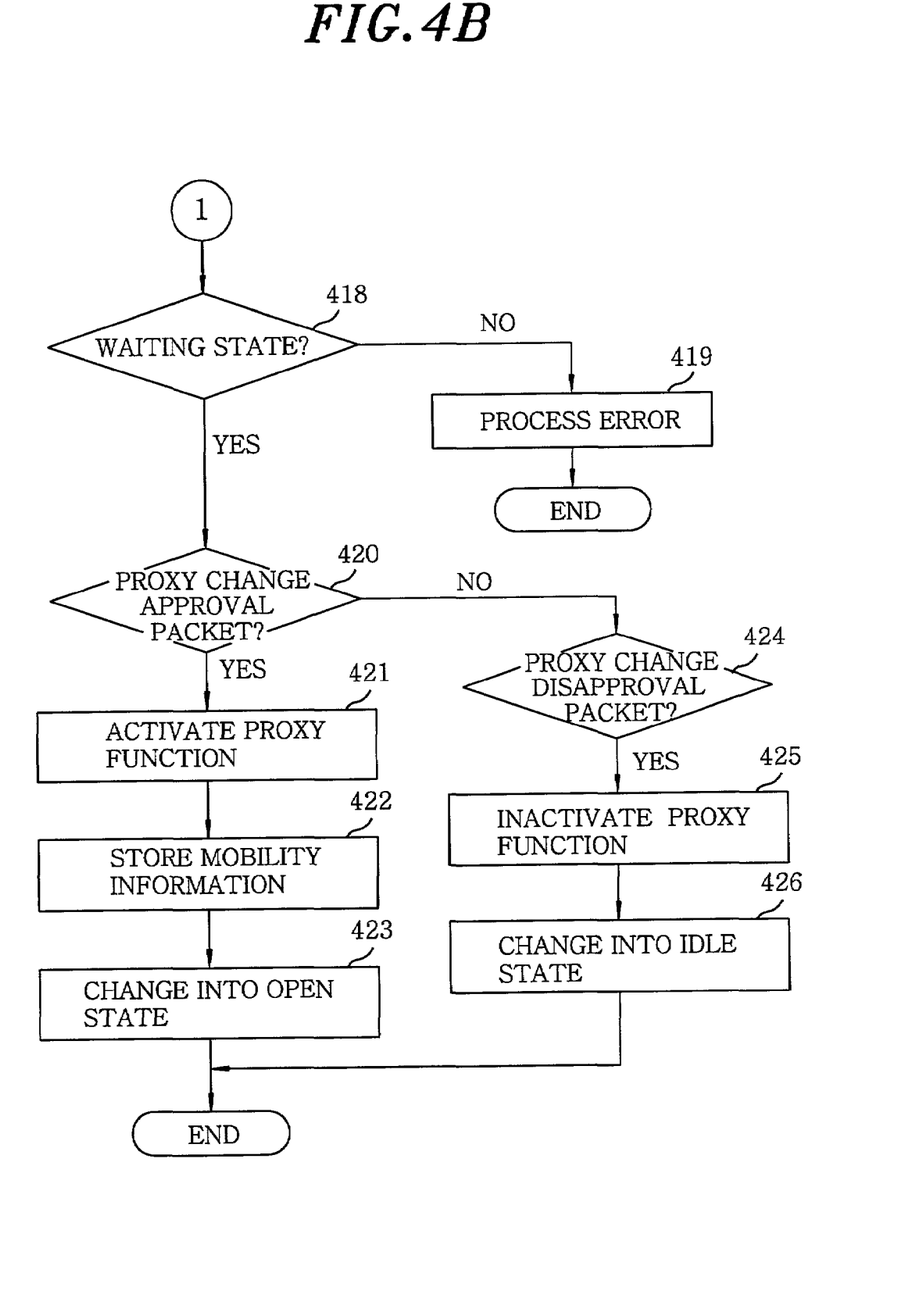
Figure 4C:
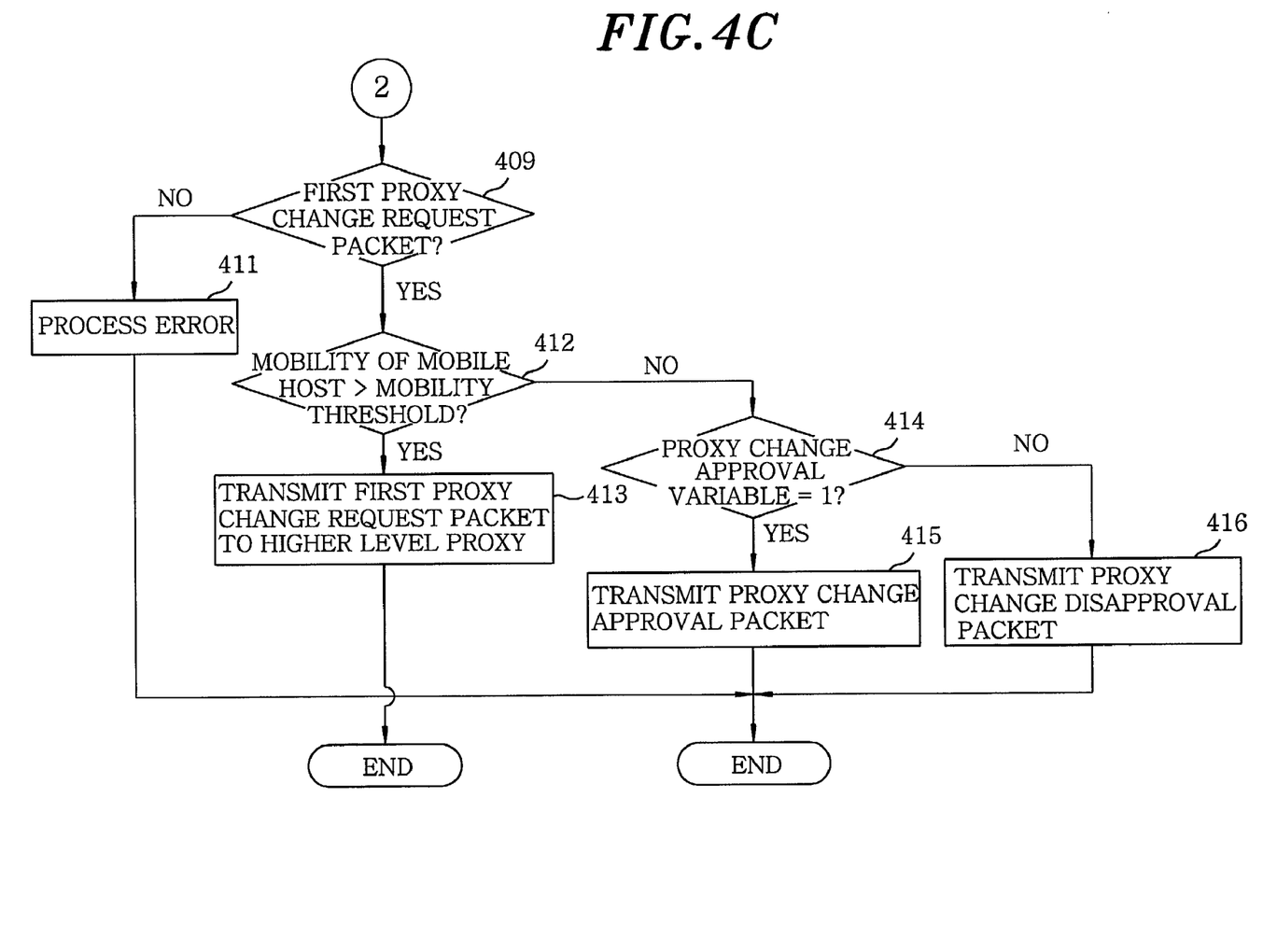

As illustrated in FIGS. 4a to 4c, when the proxy senses a movement of a new mobile host into the network where the proxy is located (step 401), the proxy transmits the second proxy change request packet to the previous proxy of the mobile host (step 402). Then, the proxy is changed into a waiting state and a process is completed (step 403). At this point, information about the previous proxy can be obtained from the new mobile host.

While, if the new mobile host does not move into the network and if the proxy is not in the waiting state, the proxy performs a process of a step 404. In the step 404, the proxy determines whether a packet transmitted from a TCP proxy is a TCP control packet depending on the type of the packet. The TCP control packet, as a packet for message exchanges between wireless TCP proxies, means the first proxy change request packet, the second proxy change request packet, a proxy change request approval packet or a proxy change request disapproval packet in the present invention.

In the step 404, if the received packet is not the TCP control packet but a packet going via the proxy, it is checked whether the proxy is in an open state, i.e., an operating state, and a proxy function of the proxy is activated, by checking a proxy activation variable of the proxy (step 406). In case that the proxy function is activated, the received packet is interpreted by the packet interceptor module 300, and then a protocol-specific function of the proxy is performed by the protocol-specific function module 600 (step 407). On the other side, in case that the proxy function is not activated, a process is completed by bypassing the packet in a state of the proxy function inactivated(step 408).

Meanwhile, in the step 404, if the received packet is the TCP proxy control packet, it is checked whether the proxy is currently in an idle state (step 405). The idle state of the proxy is, as described above, a state of the proxy function inactivated for the new mobile host. That is, it is such a case that the proxy noticed the previous proxy that the proxy is about to operate as a proxy for the new mobile host by transmitting the second proxy change request packet to the previous proxy, but the proxy receives the proxy change request disapproval packet from the previous proxy.

In the step 405, if the proxy is in the idle state, the proxy checks the reception of the first proxy change request packet from other proxies (step 409). When the first proxy change request packet is not received, all processes are completed by reporting error (step 411). Meanwhile, when the first proxy change request packet is received, the proxy determines whether the mobility of the mobile host, the mobility being recorded in the mobility field of the packet, is larger than the mobility threshold stored in the proxy (step 412).

In the step 412, if the mobility of the mobile host is larger than the mobility threshold, the proxy transmits the first proxy change request packet for the mobile host to the higher-level proxy (step 413), and completes all processes. However, if the mobility of the mobile host is smaller than the mobility threshold, the proxy checks whether the proxy change approval variable is set to 1 (step 414). If the proxy change request variable is set to 1, as shown in FIG. 3, the proxy is allowed to change to another proxy. That is, the proxy approves the proxy change to the another proxy by providing a proxy change request approval packet thereto, and operates as a proxy for the mobile host (step 415). However, if the proxy change request variable is not set to 1, the proxy change is not allowed. Therefore, the proxy transmits the proxy change request disapproval packet to the another proxy (step 416) and completes all processes.

On the other hand, in the step 405, if the proxy is not in the idle state, the proxy determines whether it is currently in a waiting state (step 418). In the step 418, if the proxy is not in the waiting state, all processes are completed by reporting error (step 419). However, if the proxy is in the waiting state, the proxy determines whether the proxy change approval packet is received from the previous proxy which the second proxy change request packet is transmitted to (step 420). In the step 420, if the proxy change request approval packet is received, the function of the proxy is activated and the mobility information of the mobile host is stored in the proxy. Then, the proxy operates as a proxy for the mobile host (steps 421 to 423). However, if the proxy change request disapproval packet is provided from the previous proxy (step 424), the proxy inactivates its proxy function (step 425) and is changed into the idle state (step 426).

As described so far, the present invention provides a method for dynamically locating a wireless TCP proxy when there is a multiplicity of wireless TCP proxies in a routing path of a wired/wireless integrated network. In accordance with the present invention, when a mobility measured by using a network resident time of a mobile host exceeds a predefined threshold, a wireless TCP proxy located in a home agent is activated. Further, when the mobility does not exceed the predefined threshold, a wireless TCP proxy located in a foreign agent is activated. Therefore, a wireless communication system using the method in accordance with the present invention has flexibility in coping with mobile hosts having various degrees of mobilities so that the efficiency of the wireless communication system is increased. Also, a reliable communication service can be provided to mobile hosts in the wireless communication system.

While the invention has been shown and described with respect to the preferred embodiments, it will be understood by those skilled in the art that various changes and modifications may be made without departing from the spirit and scope of the invention as defined in the following claims.

What is claimed is:

1. A method for dynamically locating a wireless TCP proxy suitable for a host among a of wireless TCP proxies existing in a routing path in a wired/wireless integrated network, the method comprising the steps of:
    (a) transmitting a proxy change request packet from a proxy controlling the mobile host to a first higher-level proxy if a mobility of the mobile host is larger than a mobility threshold that is preset in the proxy;
    (b) determining whether the mobility of the mobile host is larger than a mobility threshold that is preset in the first higher-level proxy;
    (c) transmitting a proxy change request packet from the first higher-level proxy to a second higher-level proxy if the mobility of the mobile host is larger than the mobility threshold of the first higher-level proxy; and
    (d) permitting selectively the proxy to be changed to another proxy if the mobility of the mobile host is smaller than the mobility threshold of the first higher-level proxy or the second higher-level proxy.

2. The method of claim 1, wherein the step (a) comprises the steps of:
    determining whether the mobility of the mobile host is larger than the mobility threshold that is preset in the proxy;
    determining whether a wireless TCP used in the wired/wireless integrated network supports a bi-directional tunneling if the mobility of the mobile host is larger than the mobility threshold which is preset in the proxy; and
    determining whether the first higher-level proxy exists in the integrated network if the wireless TCP supports the bi-directional tunneling.

3. A method for dynamically locating a wireless TCP proxy suitable for a mobile host among a plurality of wireless TCP proxies existing in a routing path in a wired/wireless integrated network, the method comprising the steps of:
    (a1) executing a proxy function of a first proxy for data packets that are transmitted the mobile host if the proxy function is activated;
    (a2) in response to a proxy activation request from other proxies, determining whether to activate the proxy function or to transfer the proxy activation request to a higher-level proxy;
    (a3) in response to a proxy change request from other proxies, determining whether to activate the proxy function based on a measured mobility or to transfer the proxy change request to the higher-level proxy;
    (b) measuring a mobility of the mobile host at a point of time when the mobile host moves outside a network; and
    (c) changing the first proxy for the mobile host into a second proxy located at an optimal position in the wired/wireless integrated network, based on the measured mobility of the mobile host.

4. The method of claim 3, wherein the step (b) comprises the steps of:
    (b1) measuring the mobility of the mobile host;
    (b2) comparing the measured mobility of the mobile host with a preset threshold; and
    (b3) transmitting a proxy change request to a higher-level proxy if the measured mobility of the mobile host is larger than the preset threshold.

5. The method of claim 3, wherein the mobility is determined by using a reciprocal of a resident time of the mobile host in the network, the resident time being calculated by deducting a point of time when the mobile host moves into the network from a point of time when the mobile host moves outside the network.

6. The method of claim 3, wherein the step (c) comprises the steps of:
    (c1) transmitting a proxy change request packet from the second proxy to the first proxy if the second proxy senses the movement of the mobile host into a network where the second proxy resides; and
    (c2) activating the proxy function of the second proxy if the first proxy approves the proxy change request packet from the second proxy.

* * * * *